United States Patent
Zimmerman et al.

(10) Patent No.: US 8,896,329 B2
(45) Date of Patent: Nov. 25, 2014

(54) IRREGULARITY DETECTION IN A STRUCTURE OF AN AIRCRAFT

(75) Inventors: Werner Zimmerman, Putzbrunn (DE); Jurgen Steinwandel, Uhldingen (DE); Sebastien Rolet, Plaisance du Touch (FR); Didier Simonet, Leguevin (FR)

(73) Assignees: European Aeronautic Defence and Space Company EADS France, Paris (FR); EADS Deutschland GmbH, Ottobrunn (DE)

( * ) Notice: Subject to any disclaimer, the term of this patent is extended or adjusted under 35 U.S.C. 154(b) by 733 days.

(21) Appl. No.: 12/994,638

(22) PCT Filed: May 26, 2009

(86) PCT No.: PCT/EP2009/003710
§ 371 (c)(1),
(2), (4) Date: Jun. 15, 2011

(87) PCT Pub. No.: WO2009/144000
PCT Pub. Date: Dec. 3, 2009

(65) Prior Publication Data
US 2011/0248732 A1 Oct. 13, 2011

(30) Foreign Application Priority Data

May 28, 2008 (EP) ..................................... 08290486

(51) Int. Cl.
*G01R 27/08* (2006.01)
*G01M 5/00* (2006.01)

(52) U.S. Cl.
CPC .......... *G01M 5/0083* (2013.01); *G01M 5/0091* (2013.01); *G01M 5/0033* (2013.01); *G01M 5/0016* (2013.01)
USPC ........... 324/693; 324/633; 324/655; 324/668; 324/682; 324/76.51; 73/773; 73/775; 73/776; 73/799

(58) Field of Classification Search
USPC .............. 324/633, 655, 668, 682, 76.51, 693; 73/773, 775, 776, 799
See application file for complete search history.

(56) References Cited

U.S. PATENT DOCUMENTS

| | | | | |
|---|---|---|---|---|
| 5,969,260 A | * | 10/1999 | Belk et al. | ........................ 73/773 |
| 6,359,444 B1 | * | 3/2002 | Grimes | ......................... 324/633 |
| 6,832,507 B1 | * | 12/2004 | van de Berg et al. | ............. 73/73 |
| 7,168,150 B2 | * | 1/2007 | Eckstein et al. | ................. 29/593 |
| 7,605,593 B2 | * | 10/2009 | Brady | ........................... 324/675 |
| 7,849,752 B2 | * | 12/2010 | Gregory et al. | .................. 73/773 |
| 2005/0007239 A1 | | 1/2005 | Woodard et al. | |
| 2005/0223812 A1 | * | 10/2005 | Denis | ............................... 73/799 |
| 2005/0287386 A1 | | 12/2005 | Sabol et al. | |
| 2008/0012577 A1 | * | 1/2008 | Potyrailo et al. | .............. 324/633 |
| 2008/0150550 A1 | * | 6/2008 | Vos | ................................ 324/655 |

FOREIGN PATENT DOCUMENTS

WO 2007088395 A 8/2007

OTHER PUBLICATIONS

International Search Report, dated Sep. 2, 2009, from corresponding PCT application.

* cited by examiner

*Primary Examiner* — Huy Q Phan
*Assistant Examiner* — Temilade S Rhodes-Vivour
(74) *Attorney, Agent, or Firm* — Young & Thompson

(57) ABSTRACT

A device, a system and a method for detecting an irregularity in a structure of an aircraft are proposed. The device includes a resonant circuit with a resonance frequency and a probe for tuning the resonance frequency of the resonant circuit. The resonant circuit and the probe are operatively connected in such a way that the probe changes the resonance frequency of the resonant circuit if the structure changes due to a formation of an irregularity.

4 Claims, 2 Drawing Sheets

IRREGULARITY DETECTION IN A STRUCTURE OF AN AIRCRAFT

FIELD OF INVENTION

The present invention relates to irregularity detection in a structure of an aircraft. In particular, the present invention relates to a device for detecting an irregularity in a structure of an aircraft. Furthermore, the invention relates to a system for detecting an irregularity in a structure of an aircraft, a method for detecting an irregularity in a structure of an aircraft, an aircraft comprising the device mentioned above and the use of a device mentioned above.

TECHNOLOGICAL BACKGROUND

In air traffic the security of vehicles is of crucial importance. Each vehicle is monitored for malfunctions and irregularities between flights and great effort is made to keep and improve the security during maintenance.

For the detection of cracks on surfaces or in junction points of components of an aircraft different sensors may be employed. For example, electric probes may be used which change their electric properties due to the formation of a crack. However, such sensors need a power supply and are to be connected to an analyzing unit for crack detection. It may be necessary to traverse large distances to the analyzing unit. Thus, the cabling can be time, space, weight and cost consuming. Furthermore, the maintenance of the power supply may be time consuming.

SUMMARY OF THE INVENTION

Accordingly, there may be a need for an improved device for detecting irregularities in a structure of an aircraft. Furthermore, there may be a need for a system and for a method for detecting an irregularity in a structure of an aircraft.

According to a first aspect of the invention, a device for detecting an irregularity in a structure of an aircraft is presented. The device comprises a resonant circuit with a resonance frequency and a probe for tuning the resonance frequency of the resonant circuit. The probe is attachable to the structure and the resonant circuit and is the probe are operably connected in such a way that the probe changes the resonance frequency of the resonant circuit, if the structure changes due to a formation of an irregularity.

In other words, the first aspect of the present invention may be seen as based on the idea to enable wireless monitoring of the intactness of structures of an aircraft. A resonant circuit with a resonance frequency is operably connected to the probe. The probe is adapted to change the resonance frequency of the resonant circuit for example by inhibiting an oscillation of energy in the resonant circuit or by changing the dispersion of the energy in the resonant circuit. The probe can be attached to the structure of the aircraft and modifies the resonance frequency of the resonant circuit to which it is also connected. The modification in the resonance frequency is caused by a change in the structure of the aircraft. The structure changes due to a formation of an irregularity which can for example be the creation of a crack or a change in the shape of the structure of the aircraft.

In the following possible features and advantages of the device according to the first aspect will be explained in detail.

The device as described above may function in the following way. The probe with a resonant circuit is attached to the structure of the aircraft. Then an irregularity in the structure for example in the surface of the skin is formed which causes a damage to the probe. The damaged probe causes a change in the resonance frequency of the resonant circuit connected thereto. The change in resonance frequency can then be detected by a detecting device.

It should be noted however, that it is not necessary that the formation of the irregularity damages the probe. According to another exemplary embodiment of the invention, the formation of the irregularity (e.g. a bending of the aircraft structure) bends the probe and thus changes the conductivity of the probe, which in turn results in a change of the resonance frequency of the resonant circuit.

An irregularity can be for example a crack or a change in shape of the structure of the aircraft like for example a bending of elements of the aircraft. The irregularity can be for example caused by an application of an external force, e.g. strong wind or a huge pressure difference during the takeoff and landing periods of the aircraft.

The aircraft can be any vehicle adapted for air traffic, like for example an airplane or a helicopter. The structure of the aircraft to be monitored can be for example a foil, the skin, or the tail of the aircraft. The structure can also be a junction point of different elements of the aircraft. The structure can be plane or it can be for example an edge.

The resonant circuit of the device can comprise a capacitor (C), an inductor (L) and possibly a resistor (R). These components can be connected in series or in parallel. Energy will be exchanged periodically between the magnetic field of the inductor and the electrical field of the capacitor, causing an electrical oscillation. Thus, high currency and high voltage are manifested at the different elements of the resonant circuit. The energy can be supplied from an external or an internal power source. The frequency (f) with which the change of the energy occurs is a typical parameter for describing the resonant circuit. The resonance frequency can be inversely proportional to the square root of the inductance L and the capacitance C. The resonance frequency can be in the range of kilo Hertz (kHz), mega Hertz (MHz) or giga Hertz (GHz). For systems like passive RFID tags a resonance frequency of some kHz may be used, for systems which are detectable in a distance of some meters a resonance frequency of 10 to 1000 MHz may be used and for long range systems a resonance frequency of some GHz may be used.

The change in the resonance frequency can for example be a modification of the resonance frequency in such a way that an oscillation and thus a resonance is is inhibited or prevented by the interaction of the resonant circuit with the probe. For example in this case if the structure is not damaged, no oscillation is possible, and only if the structure and thus, also the probe is damaged (or otherwise changed), an oscillation is possible and a resonance frequency signal can be detected.

Alternatively, the change in the resonance frequency can be a modulation of the resonance frequency in such a way that for example if the structure is not damaged the energy in the resonant circuit can oscillate at a first resonance frequency and a first resonance signal can be detected. If the structure is damaged, the energy in the resonant circuit can oscillate at a second resonance frequency, which can differ from the first resonance frequency. Then the second resonance frequency can be detected.

The probe which is operably connected to the resonant circuit can be a sensor element, for example, a crack wire which is sensitively attachable to the structure of the aircraft. Attachable can mean here that the probe can be stuck, glued, fixed or connected for example to the surface of the structure in such a way that it is damaged if the structure is damaged or changed in any way. The probe can also be mechanically fixed to the structure.

For example, the probe can represent an electrical conductor, for example, a wire like a crack wire with a certain resistance (R). Furthermore, the probe can comprise a single wire or an arrangement of several wires, like for example a grid of wires. The value of the resistance (R) can influence the resonance frequency (f) of the resonant circuit. For example, if the wire is broken due to a change in the structure of the aircraft, the resistance value of the wire changes and thus, also the resonance frequency of the resonant circuit can change.

By the employment of the device according to the first aspect of the invention, information on the intactness of the structure of the aircraft can be stored or possibly is imprinted on the device and can be read out any time in a wireless manner. Thus, no extensive cabling may be needed for the monitoring of the security of an aircraft. By avoiding the extensive cabling time, costs and weight may be saved. Furthermore, the space needed for the cabling in the prior art can be used for other purposes. And additionally maintenance time may be saved due to the possibility of a binary information output: either no signal, if the structure is intact, and a defined signal if the structure is damaged or broken, or if the structure is intact a first signal and if the structure is damaged a second signal.

According to an exemplary embodiment of the invention, a change of the structure causes a damage of the probe due to a formation of the irregularity.

The probe can be adapted to be fixed to the structure in such a way that it follows and adjusts to the shape of the structure. For example, the probe can be fixed to a support like a thin film which can be glued to the surface of the structure. The immediate damage to the probe due to a formation of an irregularity in the structure to be monitored can provide a direct detection, for example, of the creation of cracks in the surface of a structure of an airplane and reduces the risk of severe damages.

According to an exemplary embodiment of the invention, the device is adapted to be stimulated at a first resonance frequency, if the probe is not damaged and the device is adapted to be stimulated at a second resonance frequency, if the probe is damaged.

The first frequency can be a resonance frequency of the resonant circuit with an intact probe, whereas the second resonance frequency can be a resonance frequency of the resonant circuit with a probe which is not intact. The second frequency can be higher than the first frequency, for example, the second frequency is much higher than the first frequency, so the difference is detectable by conventional detectors. If for example the probe is a thin wire it can have a resistance (R) near zero in the resonant circuit. When the wire is cracked, the resistance changes to near infinity. In a resonance circuit with an adequate design a resistance of the wire near zero can cause the first resonance frequency with an intact probe to be lower than the second resonance frequency with a damaged probe.

The probe can also shorten the resonant circuit. For example it can shorten an inductor (L) and/or a capacitor (C) of the resonant circuit. Also here the probe can be a thin wire which closes and thus, shortens the resonant circuit and has a resistance which is near zero Ohm. If the wire is cracked due to a formation of an irregularity in the structure, the resonant circuit is not shortened any more and the energy in the resonant circuit can oscillate at a predefined second frequency. In this case, if the probe is not damaged, the first resonance frequency can not be detected.

The stimulation of the resonance frequencies can for example be done by sending an electro magnetic wave like a radio wave with an appropriate frequency to the device.

The existence of two different resonance frequencies can be very advantageous, because the device can thus provide different types of information. On the one hand, if the device can be stimulated at the first resonance frequency it can be assumed that the probe is not damaged and thus also the structure to be monitored is not damaged and intact. On the other hand, in the case that the device can be stimulated at the second resonance frequency it can be assumed that the probe is damaged and thus also the structure to be monitored is damaged. Then the necessary steps like for example the exchange of the structure or of its parts can be initiated. Furthermore, if the device can not be stimulated at any of the two resonance frequencies, it can be assumed that the device is damaged as a whole and no conclusion on the state of the structure can be deduced. In this way the functionality of the device and also the intactness of the structure may be monitored.

According to a further exemplary embodiment of the invention the resonant circuit is part of an RFID tag.

Radio Frequency Identification (RFID) is a method for automatic identification based on storing and remotely retrieving data using RFID tags or so-called transponders. The storing and retrieving of data is done using radio waves.

The RFID tag is an object that can be applied or incorporated into a structure and which can, when stimulated by radio waves, be read out from several millimeters to some hundred meters away from the structure. The RFID tag can contain an integrated circuit for storing and processing information and modulating and demodulating the radio frequency signal. The radio frequency signal can be for example modulated and demodulated by an Identification Integrated Circuit (IDIC), which can also be part of the RFID tag. The RFID tag also contains an antenna for receiving and transmitting a signal, this antenna can for example be an inductor, which is part of the resonant circuit.

The RFID tag of the device can be an active or a passive element. An active RFID tag can emit information continuously, whereas a passive RFID tag only emits information like for example the IDIC only when stimulated by an external energy source. The RFID tag can contain an internal energy source or be excitable by an external energy source. A passive RFID tag may be used for a device according to the invention because in this case no continuous energy supply would be required and only when necessary for example during maintenance the passive RFID tag may be stimulated. This may save costs for example by avoiding the use of batteries.

The embodiment of the resonant circuit as part of an RFID tag is advantageous because an already existing and established technique can be employed as part of the device, which can facilitate the development and design of the device and possibly reduce costs. Furthermore, by using an RFID tag for each device an individual identification number (IDIC) can be detected and hence each malfunction or damage can be located relatively exactly and identified in a short period of time.

According to a further exemplary embodiment of the invention the probe is a crack wire and the resonant circuit is an LC circuit.

An LC circuit consists of an inductor (L) and the capacitor (C), possibly also a resistance (R), which are connected together in series or in parallel. An electrical current can alternate between these components at the frequency (f) which is indirectly proportional to the square route of the inductance and the capacitance. A power source can be incorporated directly into the circuit, alternatively the energy for the oscillation is provided by an external power source as for example a radio frequency transmitter.

A crack wire is an electrical conductor like a wire, which can be attached to a structure and can adjust and align to the structure's shape. Moreover, the crack wire may be easily cracked, damaged or broken if the structure to which it is attached undergoes a change or modulation for example due to the creation of a crack on the surface of the structure. The crack wire may for example be electrically powered at one end and restore voltage corresponding to the power supply at the other end if the structure to be monitored is not broken. The employment of a crack wire in combination with an LC circuit may provide a relatively uncomplicated design of the device for detecting irregularities in a structure of an aircraft. The crack wire can be used as part of the resonant circuit and represent the resistance which modulates depending on the intactness of the crack wire.

According to a further embodiment of the invention, the structure is one of a wing, a skin and a tail unit of the aircraft.

The structure can be furthermore any junction point of the elements mentioned above or any further element of an aircraft.

According to a second aspect of the invention, a system for detecting an irregularity in a structure of an aircraft is presented. The system comprises a device according to one of the embodiments mentioned above and a readout unit adapted for reading out the device in a contactless manner.

The readout unit can be adapted to send and receive signals. Preferably the signals are radio wave signals which comprise signals at the resonance frequency of the device described above. For example, a first and a second resonance frequency of the device are included in the signals. The signals of the readout unit in the different frequencies can be emitted successively or at the same time.

The readout unit can comprise a power source or can be connected to an external power source. Furthermore, the readout unit can comprise a display and/or an acoustic unit which may indicate possible malfunctions, damages and dangers to the security of the structure to be monitored by vision and/or by sound. The readout unit can also comprise an evaluating and/or analyzing unit and be connected to a further system.

For example, if the structure to be monitored is damaged, i.e. comprises an irregularity, the probe of the device described above is also damaged and thus changes the resonance frequency of the resonant circuit. When the readout unit sends signals at the first resonance frequency it does not receive any significant signals is back from the device. When the readout unit sends signals at the second resonance frequency which corresponds to a damage in the structure it receives a signal back possibly with an IDIC, so the damage may be identified exactly and also located.

A contactless manner here denotes the transmission of signals without using cabling or wires. Information may be transferred over a certain distance here without the use of for example an electrical conductor. The described system may help avoiding extensive cabling and hence save space, time, costs and weight.

According to a third aspect of the invention, a method for detecting an irregularity in a structure of an aircraft is presented. The method comprises the following steps: Stimulating a resonant circuit at a resonance frequency of the resonant circuit; receiving a signal from the resonant circuit, wherein the signal from the resonant circuit corresponds with a change of the structure due to a formation of an irregularity.

According to a further embodiment of the invention, the method is carried out using a device according to the embodiments described above.

According to a further embodiment of the invention, if the probe is not damaged an ID number of an RFID tag in which the resonant circuit is comprised is not readable. And if the probe is damaged the ID number of the RFID tag in which the resonant circuit is comprised is readable.

The stimulating may be done for example with a readout unit as described above.

According to a fourth aspect of the invention, an aircraft comprising a device as described above is presented.

According to a fifth aspect of the invention, the use in an aircraft of a device as described above is presented.

It has to be noted that embodiments of the invention are described with reference to different subject-matters. In particular, some embodiments are described with reference to apparatus type claims, whereas other embodiments are described with reference to method type claims. However, a person skilled in the art will gather from the above and the following description that, unless other notified, in addition to any combination of features belonging to one type of subject-matter also any combination between features relating to different subject-matters is considered to be disclosed with this application.

The aspects defined above and further aspects, features and advantages of the invention may also be derived from the examples of embodiments to be described hereinafter and are explained with reference to examples of embodiments. The invention will be described in more detail hereinafter with reference to examples of embodiments but to which the invention is not limited.

DETAILED DESCRIPTION OF EMBODIMENTS OF THE INVENTION

Figure 1:
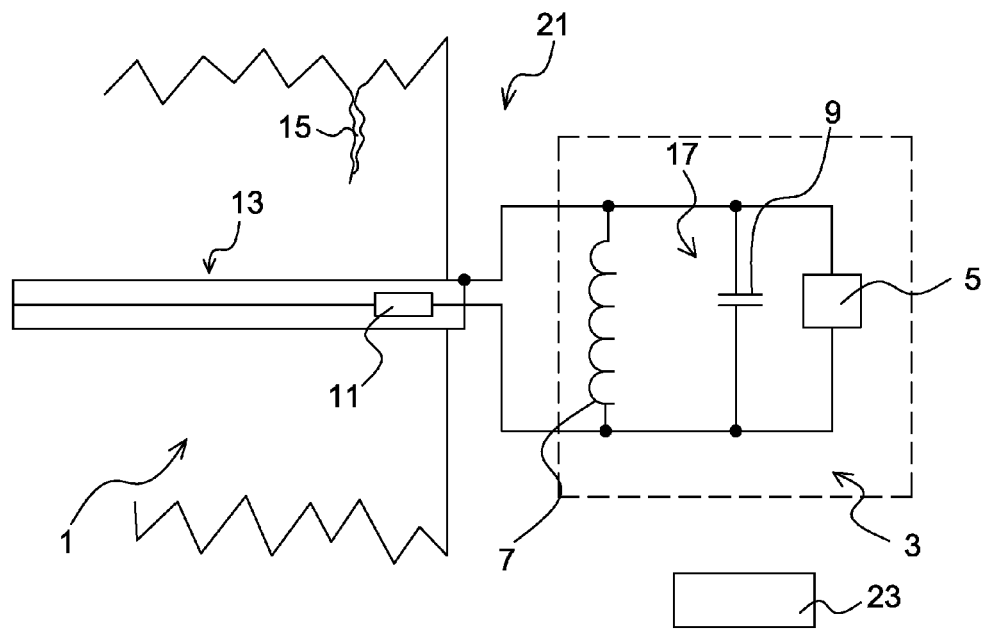
FIG. 1 shows a schematic representation of a device for detecting an irregularity in a structure of an aircraft according to an exemplary embodiment of the invention.

The illustration in the drawings is schematically only. It is noted that in different figures, similar or identical elements are provided with the same reference signs.

FIG. 1 describes a device for detecting an irregularity in a structure of an aircraft according to an embodiment of the invention with a crack wire which is shortening the resonant circuit.

The device 21 for detecting an irregularity comprises a crack wire 13 and an RFID tag 3. In the device 21 in FIG. 1 the probe which here is a crack wire 13 is intact and is attached to the structure 1 of an aircraft. The crack wire 13 comprises a resistance 11. The crack wire 13 is furthermore electrically connected to a resonant circuit 17 which is part of the RFID tag 3. The RFID tag 3 can be also attached to the structure or alternatively be loose. The resonant circuit 17 comprises an inductance 7 in the form of a coil antenna. A first capacitance 9 which is in parallel to the inductance 7 is also included in the resonant circuit 17. An IDIC 5 is part of the RFD tag 3 and also is part of the resonant circuit 17. A crack 15 is present in the structure 1 of an aircraft which in FIG. 1 is not in the range of the device 21 for detecting an irregularity.

While the crack wire 13 is not damaged, i.e. intact, the resonant circuit 17 is shortened. Thus, if the device 21 is stimulated by a readout unit 23 at the resonance frequency of the resonant circuit 17, the ID number stored in the IDIC 5 is not readable with the help of the readout unit 23. The ID number is readable only in the case that the crack wire 13 is damaged. Thus for example by scanning a structure 1 of an aircraft to be monitored, where several devices 21 are applied only RFID tags 3 of the devices 21 with a broken crack wire 13 announce themselves to the readout unit 23. This procedure can save a lot of time during the process of maintenance.

Figure 2A:
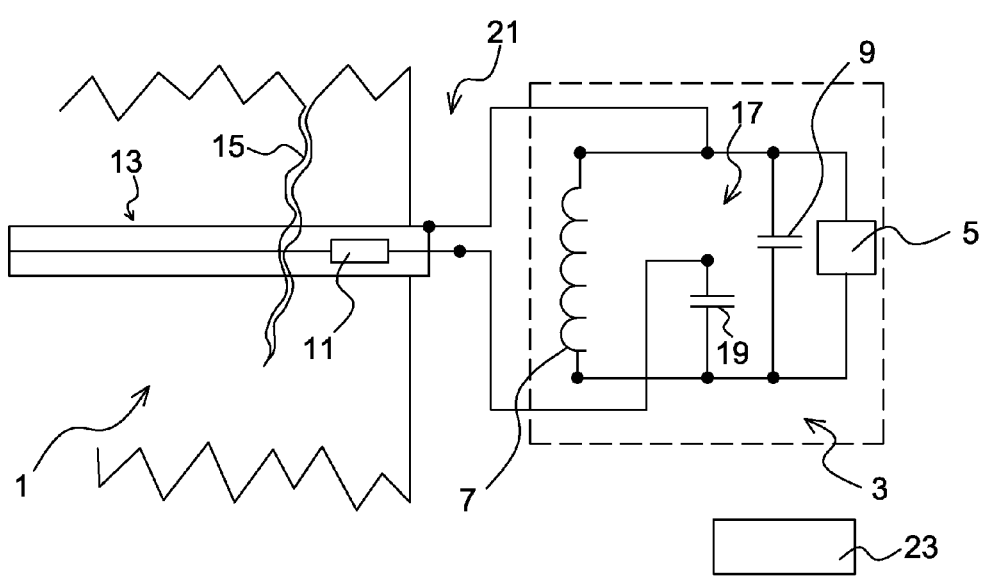
FIG. 2A shows a schematic representation of a device for detecting an irregularity in a structure of an aircraft according to a further exemplary embodiment of the invention.

In FIG. 2A a device for detecting an irregularity in a structure of an aircraft according to a further embodiment of the invention is described. In the embodiment of FIG. 2A the crack wire 13 is tuning/detuning the resonant circuit 17.

The design of the device 21 in FIG. 2A is similar to the design of the device 21 in FIG. 1 but the device 21 in FIG. 2A further comprises a second capacitance 19 which is in parallel to the first capacitance 9. The crack wire 13 with the resistance 11 is in series with the second capacitor 19. In this embodiment if the crack wire 13 is cracked, the resistance 11 is approximately infinity. If no crack 15 occurs, the resistance is approximately zero. In FIG. 2A the crack wire 13 is damaged due to the occurrence of a crack 15 in the structure 1 of an aircraft. The resonance frequency of the resonant circuit 17 can be approximately calculated according to the following equation for the circuit shown in FIG. 2A:

$$f = \frac{1}{2\pi\sqrt{L \cdot (C_2/R + C_1)}}$$

where L is the inductance 7, $C_1$ is the first capacitance 9, $C_2$ is the second capacitance 19, and R is the resistance 11.

If the crack wire 13 is not damaged, the resistance 11 can be approximated by a value near zero: $R \approx 0\Omega$. Hence, the first resonance frequency $f_1$ converges to small values.

If the crack wire 13 is damaged, the resistance 11 can be approximated by a value near infinity: $R \approx \infty$. Hence, the second resonance frequency $f_2$ can be calculated according to the following equation:

$$f_1 = \frac{1}{2\pi\sqrt{L \cdot C_1}}$$

Thus, if the crack wire 13 is cut, the resonance frequency is shifted to a higher frequency. In the case shown in FIG. 2A, the readout unit 23 can stimulate the device 21 at the second resonance frequency and in this way detect the crack 15 in the structure 1 of the aircraft.

Figure 2B:
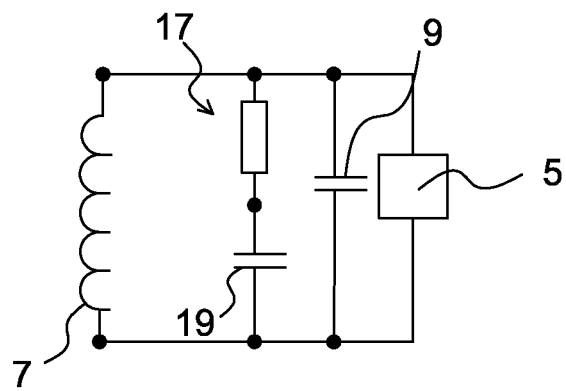
FIG. 2B shows a schematic representation of a part of a device for detecting an irregularity in a structure of an aircraft in analogy to the embodiment presented in FIG. 2A.

In FIG. 2B a part of a device for detecting an irregularity in a structure of an aircraft in analogy to the embodiment presented in FIG. 2A is described. The resonant circuit 17 represented in FIG. 2B is in analogy to the resonant circuit 17 of FIG. 2A. Here it can be easily seen how the crack wire 13 is incorporated with its resistance 11 into the resonant circuit 17.

It should be noted that the term "comprising" does not exclude other terms or steps and the "a" or "an" does not exclude a plurality. Also elements described in association with different embodiments may be combined. It should also be noted that reference signs in the claims should not be construed as limiting the scope of the claims.

LIST OF REFERENCE SIGNS

1 structure of an aircraft
3 RFID tag (radio frequency identification tag)
5 IDIC (identification integrated circuit)
7 inductance
9 first capacitance
11 resistance
13 crack wire
15 crack
17 resonant circuit
19 second capacitance
21 device for detecting an irregularity
23 read-out unit

The invention claimed is:

1. A method for detecting an irregularity in a structure of an aircraft, the method comprising:
   providing a transponder stimulated by a radio signal at a resonance frequency of a resonant circuit of said transponder, wherein
   a probe is connected to the resonant circuit so that, when probe is not damaged,
   said resonance frequency is significantly modified from a second resonance frequency to a first resonance frequency, and
   the probe is sensitively attached to a surface of the structure, said probe being damaged in case of a structure change due to formation of an irregularity;
   deducing that the structure has an irregularity if a return signal is received from the transponder and an ID number of an RFID tag, in which the resonant circuit is comprised, is readable when stimulating the transponder using a stimulating signal at the second resonance frequency of the resonant circuit; and
   deducing that the probe is not damaged and the structures has no irregularity if the transponder returns a signal and the ID number of the RFID tag, in which the resonant circuit is comprised, is not readable when stimulated using a stimulating signal at the first resonance frequency.

2. The method according to claim 1, wherein it is deduced that the probe is damaged and the structures has irregularities if the transponder don't return a signal when stimulated using a stimulating signal at the first resonance frequency and returns a signal when stimulated using a stimulated signal at the second resonance frequency.

3. The method according to claim 1,
   wherein it is deduced that the transponder is damaged if the transponder is not stimulated for both stimulating signals using first resonance frequency and second resonance frequency.

4. The method according to claim 1,
   wherein the probe is sensitively attached to a surface of the structure by sticking or gluing.

* * * * *